US011677647B2

(12) United States Patent
Balazs et al.

(10) Patent No.: US 11,677,647 B2
(45) Date of Patent: Jun. 13, 2023

(54) NETWORK DEVICE IDENTIFICATION (71) Applicant: Cujo LLC, Walnut, CA (US)

(72) Inventors: Zoltan Balazs, Gyongyossolymos (HU); Kimmo Kasslin, Espoo (FI)

(73) Assignee: Cujo LLC, Walnut, CA (US)

( * ) Notice: Subject to any disclaimer, the term of this patent is extended or adjusted under 35 U.S.C. 154(b) by 0 days.

(21) Appl. No.: 17/523,519

(22) Filed: Nov. 10, 2021

(65) Prior Publication Data

US 2023/0143232 A1 May 11, 2023

(51) Int. Cl.
G06F 15/16 (2006.01)
H04L 43/065 (2022.01)
H04L 67/303 (2022.01)
H04L 41/16 (2022.01)
H04L 43/0876 (2022.01)
H04L 43/04 (2022.01)

(52) U.S. Cl.
CPC ............ *H04L 43/065* (2013.01); *H04L 41/16* (2013.01); *H04L 43/04* (2013.01); *H04L 43/0876* (2013.01); *H04L 67/303* (2013.01)

(58) Field of Classification Search
CPC ....... H04L 43/065; H04L 41/16; H04L 43/04; H04L 43/0876; H04L 67/303
USPC ......................................................... 709/223
See application file for complete search history.

(56) References Cited

U.S. PATENT DOCUMENTS 9,743,272 B1 * 8/2017 Ogrinz .................... H04L 67/12
10,015,768 B1 * 7/2018 Wang ..................... H04W 12/64
10,931,768 B2 * 2/2021 Kuperman .......... H04L 43/0894
11,212,681 B1 * 12/2021 Balaramn ........... H04L 63/1466
(Continued)

FOREIGN PATENT DOCUMENTS

EP 3563554 B1 * 7/2020 ............. G06F 16/20

OTHER PUBLICATIONS

Marchal et al., AuDI: Toward Autonomous IoT Device-Type Identification Using Periodic Communication, Jun. 1, 2019, IEEE Journal on Selected Areas in Communications (vol. 37, Issue: 6, pp. 1402-1412). (Year: 2019).*

(Continued)

Primary Examiner — Moustafa M Meky
Assistant Examiner — Thorne E Waugh
(74) Attorney, Agent, or Firm — Dority & Manning, P.A.

(57) ABSTRACT

A device identification method where a device application usage profile is generated and maintained for each one or more known computing devices of a local network based on network traffic data. In response to detecting an unknown computing device in the local network, network traffic data related to the unknown computing device is collected, and a device application usage profile for the unknown computing device is generated based on the network traffic data related to the unknown computing device. The device application usage profile of the unknown computing device is compared with the device application usage profile of the one or more known computing devices of the local network. In response to detecting a difference between the device application usage profile of the unknown computing device and the device application usage profile of the one or more known computing devices of the local network satisfying a predetermined threshold, the unknown device is identified as one of the known computing devices of the local network.

20 Claims, 3 Drawing Sheets

(56) References Cited

U.S. PATENT DOCUMENTS

| | | | |
|---|---|---|---|
| 2007/0294747 A1 | 12/2007 | Rosenberger | |
| 2016/0155128 A1 | 6/2016 | Desai et al. | |
| 2018/0041542 A1* | 2/2018 | Harvey | H04L 63/1483 |
| 2018/0131624 A1* | 5/2018 | Samadani | H04L 63/1408 |
| 2018/0191593 A1* | 7/2018 | De Knijf | H04L 41/50 |
| 2020/0076799 A1* | 3/2020 | Lackey | G06F 21/73 |
| 2020/0076909 A1 | 3/2020 | Kuperman et al. | |
| 2020/0120142 A1* | 4/2020 | Maynard | G06Q 10/067 |
| 2021/0335505 A1* | 10/2021 | Tedaldi | G06F 18/254 |
| 2022/0051113 A1* | 2/2022 | Kazlauskis | H04W 12/71 |

OTHER PUBLICATIONS

Chaabouni et al., Network Intrusion Detection for IoT Security Based on Learning Techniques, Jul. 1, 2019, IEEE Communications Surveys & Tutorials (vol. 21, Issue: 3, pp. 2671-2701). (Year: 2019).*

Extended European Search Report for EP Application No. 22193903. 6, dated Mar. 14, 2023, 12 pages.

Author Unknown, "Cujo AI Explorer, Securing and Enhancing Connected Experiences Through Access to Data," 2020, 19 pages.

Delahunt, Barry, "Why CUJO AI Device Intelligence Is Unaffected by MAC Randomization," https://cujo.com/why-cujo-ai-device-intelligence-is-unaffected-by-mac-randomization/, Oct. 20, 2020, 9 pages.

Sanchez, Pedro Miguel Sanchez, et al., "A Survey on Device Behavior Fingerprinting: Data Sources, Techniques, Application Scenarios, and Datasets," IEEE Communications Surveys & Tutorials, vol. 23, No. 2, Second Quarter 2021, 1048-1077, 10.1109/COMST.2021.3064259, 2021, 30 pages.

* cited by examiner

NETWORK DEVICE IDENTIFICATION

TECHNICAL FIELD

The present application relates generally to network security, and specifically to identifying devices in a computer network.

BACKGROUND

It is vital to identify network devices in a computer network to enable, for example, controlling access to computer networks or services, applying required communication policies, and/or preventing and monitoring unauthorized access.

It can be desirable to have reliable network device identification methods for enabling different security protection features, such as blocking specific applications and enforcing time limits to applications or application categories.

SUMMARY

According to an aspect of the invention there is provided a method as specified in claim 1.

According to another aspect of the invention, there is provided an apparatus in a computer network system as specified in claim 14.

According to another aspect of the invention, there is provided a non-transitory computer-readable medium comprising stored program code, the program code comprised of computer-executable instructions that, when executed by a processor, causes the processor to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for the purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Reliable active application usage time determination is needed for enabling different security protection features, such as blocking specific applications, enforcing time limits to applications or application categories.

The determination/estimation processes are complicated by frequent application updates changing the networking behavior of the applications and thus, forcing updates on the detection process.

There is a need for automated techniques for estimating active application usage time in computer networks.

Figure 1:
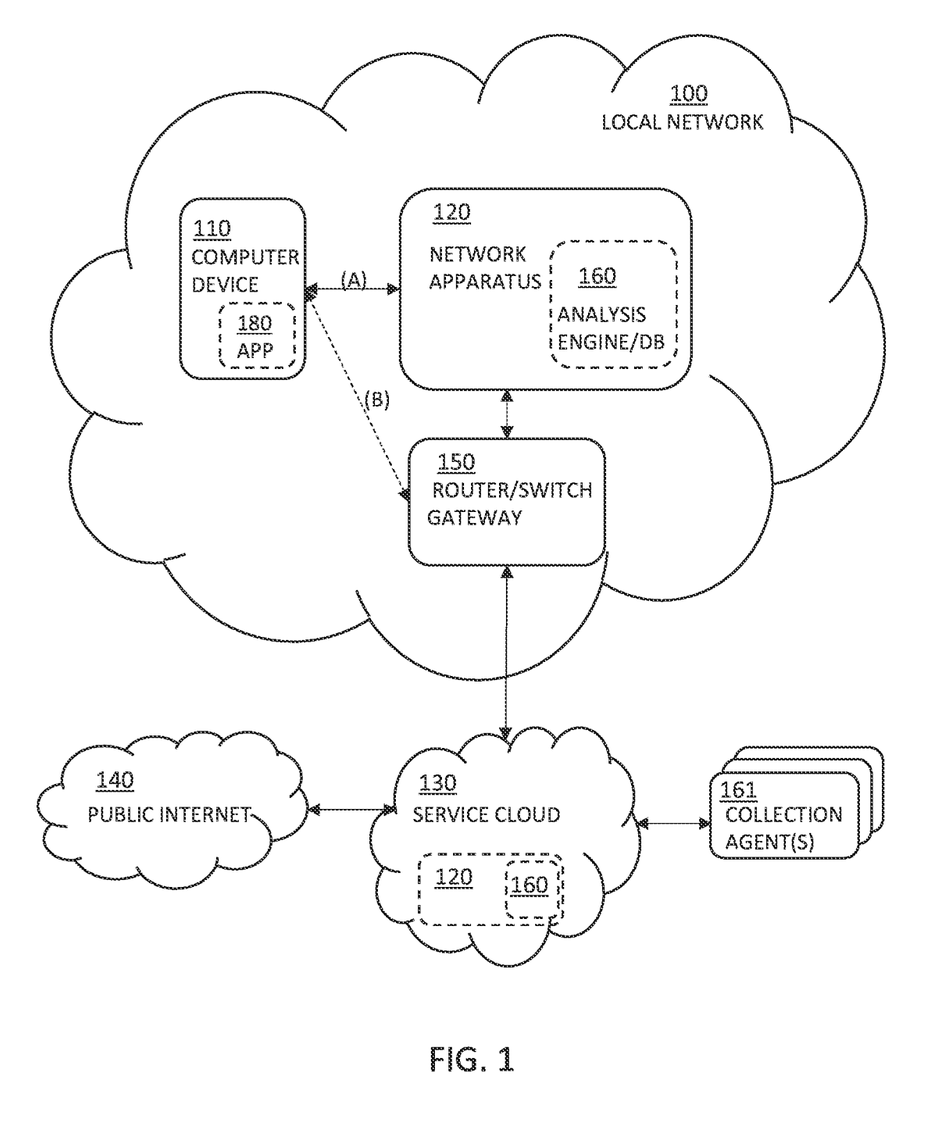
FIG. 1 is a block diagram illustrating an example system environment for a network apparatus in a computer network system.

FIG. 1 illustrates schematically an example of a system environment for a network apparatus 120. The system environment illustrated in FIG. 1 includes a computer network 100, such as a local network, that may include one or more computing devices 110, the network apparatus 120, a local router/switch 150, and an analysis engine and a database 160. The computing devices 110 may also comprise any number of client applications 180. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer/computing device, such a user device, a smart device, a smart appliance, a smart phone, a laptop, or a tablet having a network interface and an ability to connect to the network apparatus 120 and/or the local network router 150 with it. The network apparatus 120 collects information, e.g., about the computer network 100, including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computing device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 may be a network device configured to communicate with the Internet 140 or computer network 100. In some embodiments, the device 110 executes one or more applications (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. One or more of these devices are connected to the Internet 140, for example, via one or more Wi-Fi access points.

Device intelligence is used to identify device types and operation system versions connected to home routers, for example. Medium access control (MAC) randomization is a privacy feature used on phone, tablets, and computer, and it changes the MAC address of the device periodically to prevent tracking. Device deduplication is a process where a new device is found on a computer network with a new MAC address, but later is determined to be a same device that had been known from the past. The embodiments of the present invention enable improving previous device deduplication solutions that produce false positives and false negatives. Further, in the future it is expected that some of the previous solutions, such as MDNS owner option, DHCP transaction Id, DHCPv6 clientId), will not work anymore. Embodiments of the present invention also enable tracking devices based on application usage and thus improving the device deduplication problem. Application usage-based identification/tracking according to embodiments of the invention also help where current solutions fail to properly deduplicate devices.

Figure 2:
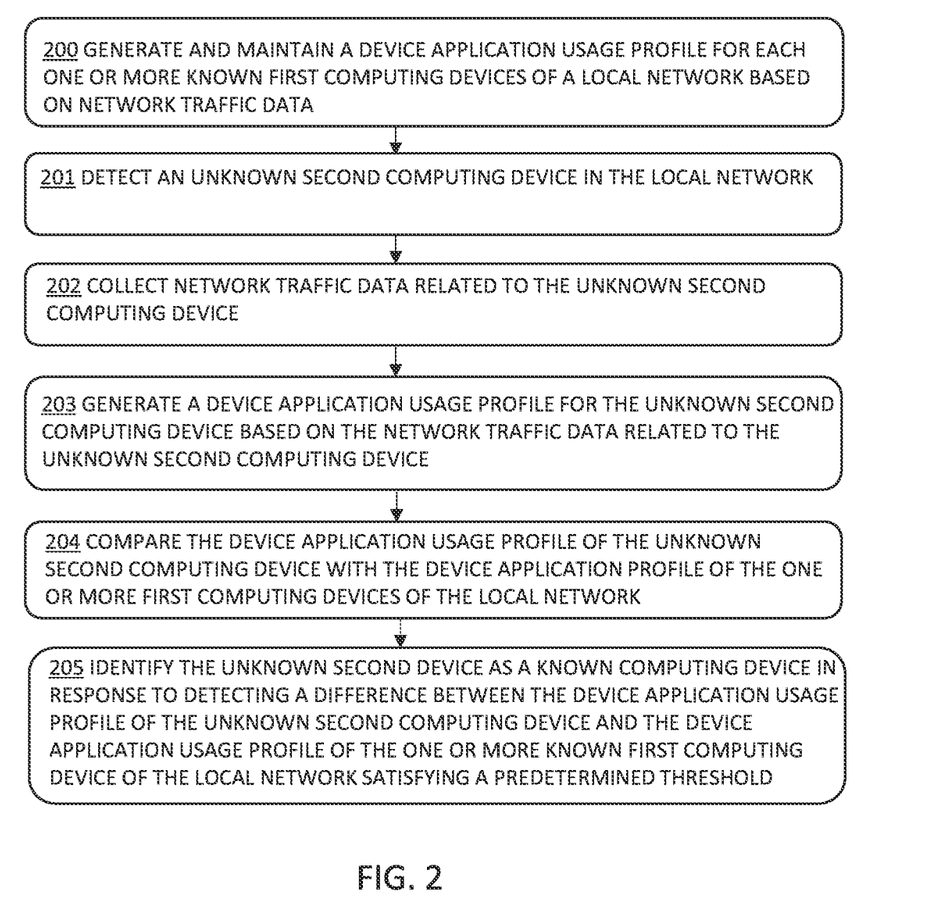
FIG. 2 is a flow diagram illustrating an example method, according to one embodiment.

FIG. 2 is a flow diagram illustrating an embodiment of a method.

In 200, a device application usage profile is generated and maintained for each one or more known first computing devices of a local network based on first network traffic data.

In 201 an unknown second computing device is detected in the local network.

In 202 second network traffic data related to the unknown second computing device is collected.

In 203 a second device application usage profile is generated for the unknown second computing device based on the second network traffic data related to the unknown second computing device.

In 204, the second device application usage profile of the unknown second computing device is compared with the first device application usage profile of the one or more known first computing devices of the local network.

In 205, in response to detecting a difference between the second device application usage profile of the unknown second computing device and the first application usage profile of the one or more known first computing devices of the local network satisfying a predetermined threshold, identifying the unknown second computing device as one of the one or more known first computing devices of the local network.

In an embodiment, the network traffic data used to generate the first and the second device application usage profiles comprises one or more of: background traffic data generated by one or more applications installed on the one or more first and second computing devices, data generated by active usage of the one or more applications, and/or data generated from running the one or more applications in various application scenarios on the one or more first and second computing devices for one or more predetermined time periods.

In an embodiment, the network traffic data is collected by a network traffic hub of the local network.

In an embodiment, the method further comprises collecting the network traffic data for generating the first and second device application usage profile during one or more predetermined time periods.

In an embodiment, the first and second device application usage profiles for the first and second computing devices is generated based on one or more of: a device identification data, an application identification data and a time window when the application was used.

In an embodiment, an active application usage time in relation to an application scenario is determined during the time window based on the first and second network traffic data and the active application usage time is used for generating the first and second device application usage profile.

In an embodiment, the method further comprises updating the first device application usage profile regularly by one or more of: a differential update, generating one or more new device application usage profiles.

In an embodiment, data related to hardware usage of the one or more computing devices is collected by the network traffic hub and the data related to the hardware usage is used for generating the first and second device application usage profiles.

In an embodiment, the process of identifying the unknown second computing device as a known first computing device further comprises: in response to detecting any one of the one or more known first computing devices transferring network traffic data by using a same unique identifier address with the unknown second computing device based on comparing, identifying the unknown second computing device as the known first computing device.

In an embodiment, the method further comprises training a machine learning model to generate the first and second device application usage profiles and using the machine learning model to identify the unknown second computing device as a known first computing device of the local network.

In an embodiment, the machine learning model is retrained continuously and/or regularly based on further network traffic data captured from the one or more computing devices running further applications in various application scenarios.

In an embodiment, the network traffic data collected from the one or more computing devices is forwarded to a service cloud for generating the device application usage profile for the one or more known computing devices and/or the unknown computing device.

In an embodiment, the predetermined threshold that is used in the identification of the unknown device as a known computing device may be calculated based on one or more values or conditions related to the device application usage profiles. Common thresholds may include different values and conditions. For example, the predetermined threshold here may be a numeric value defining the number of same applications included in the device application usage profiles of the device application usage profiles that are being compared. In an embodiment, the predetermined threshold may be calculated based on more than one value or conditions related to the device application usage profile data. Further examples of the data that can be used for calculating the predetermined threshold comprise one or more of: number of different or missing applications in the device applications usage profiles being compared, data generated by active usage of one or more applications of the device application usage profiles, and data generated from running the one or more applications in various application scenarios. The threshold conditions may usually include any of: "greater than", "same", "below or equal". The term "satisfying the predetermined threshold" used herein refers to defining the instant when a value is below or equal to a predefined value. Thus, the unknown device may be identified as a known computing device only if a representative amount of same/similar values or conditions are detected based on comparing the device application usage profile of the unknown computing device and the device application usage profile of the one or more known computing devices. In an embodiment, any number of suitable techniques for defining the similarity and/or dissimilarity between the device application usage profile data, such as similarity or distance based metrics, can also be used.

In an embodiment, further action is taken on the basis of identifying the unknown computing device as a known computing device of the local network, wherein the further action comprises one or more of: reporting a deduplication incident, controlling or blocking usage of the one or more applications, enforcing time limits on the one or more applications or on application categories, preventing computing with the one or more applications, and applying other security measures to protect a local network and/or the one or more computing devices.

In an embodiment, the device application usage profiles may define which applications are used in the one or more computing devices and/or usage patterns of the applications. The device application usage profiles may also be based on identified set of actions or steps that are executed in the application in an ordered manner in predefined time intervals, for example. The device application usage profile may also be generated based on data resembling a natural user interaction with an application such as starting a media application, browsing media streams for 2 minutes, selecting a media stream, playing the media stream for 5 minutes, stopping playback, closing the application and any combination thereof. Various application scenarios may also be used to mimic user behaviour and for generating actions performed by the application about "typical" network traffic. This may then be used by the machine learning model to generate the device application usage profile. For example, the network traffic that is generated by a (real or simulated) user interaction with an application differs from the network traffic that the application would generate just by running in the background. These are the differences that the machine learning model can be trained to learn.

In an embodiment, the network traffic data generated by the one or more application is forwarded to a security service cloud for analysis and device application usage profiling.

Figure 3:
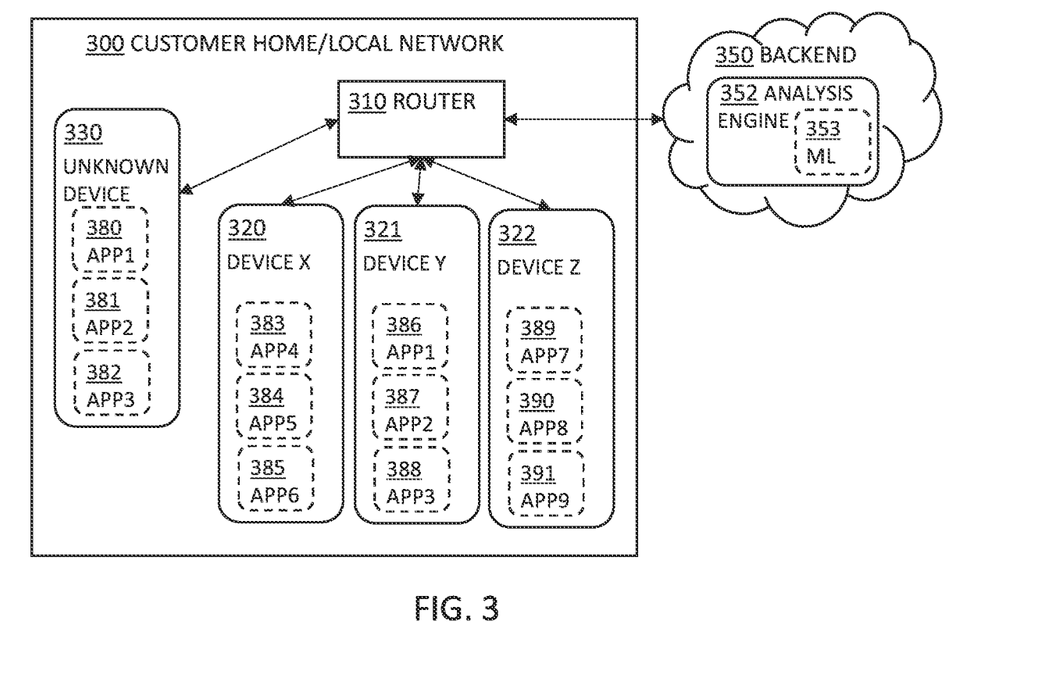
FIG. 3 is a block diagram of a computer apparatus, according to one embodiment.

FIG. 3 is a block diagram that illustrates schematically another example of a system environment.

The system environment illustrated in FIG. 3 includes a computer network 300, such as a local network, that may include any number of computing devices 320-330, and any number of local routers 310. The computing devices 320-330 may comprise any number of client applications 380-391. The example system also includes a service cloud/backend 350 and an analysis/research engine 352 that may each comprise any number of application/device detection services/machine learning models 353. The service cloud 350 and/or the local network 300 may comprise one or more databases/data storages for storing device application profile related data, network traffic data and any other data required for the device identification process such as labelling and training data for a machine learning module 353, for example. Even though the different entities are illustrated as separate entities in this example, one or more of the entities can be combined into one entity and/or further entities may be added to any of the entities.

The local network 300 may also run a dedicated software application, such as an agent of a local or an internet service provider (ISP) network, for collecting and recording application network traffic metadata relating to applications and software running on the computing devices 320-330 and using the computer network. In an embodiment, a dedicated software agent may be deployed in the one or more computing devices In this use case example, one of the computing devices is a new unknown device 330 to the local network 300, such as a smart phone, a tablet or a computer. In response to the interaction with the client application, the client application generates network traffic which is routed via a customer-premises equipment (CPE), such as the router 310. The router 310 forwards the network traffic description information (netflow) to the service cloud 350. Information about which client applications were running on which mobile devices can be recorded and this information may later be used as a network traffic data (netflow) label.

The mobile devices 320-322 of the computer network 300 generate network traffic data by casual application usage which is routed via the router 310. The network traffic description information (netflow) related to the generated network traffic data is then forwarded to the backend 350 and to the analysis engine 352 by the router 310.

Labels may be assigned to the netflow data at the analysis engine 352, and after labelling, the network data is sent to a machine learning module to train the machine learning model 353. The machine learning module infrastructure is configured to train the machine learning model 353.

In an embodiment, the trained machine learning model 353 may be propagated to the service cloud and used in device identity determination.

In an embodiment, the collected application network traffic metadata may be transmitted via the local router 310 but also sending directly via a network gateway is possible, for example when the device is not in the computer network. The collected application network traffic metadata may comprise following data but is not limited to it: an application name, an identification of the application, a version of the application, a network traffic protocol type (e.g. Transmission Control Protocol (TCP), Hypertext Transfer Protocol (HTTP), Hypertext Transfer Protocol Secure (HTTPS), User Datagram Protocol (UDP), Domain Name System (DNS), Multicast DNS (MDNS)), a timestamp of a connection, a connection target, a connection direction, number of transferred bytes to upstream and/or downstream, and a computer device identification running the dedicated software application.

Each local router 310 of a plurality of local networks may collect network traffic data from the local networks. Data feeds from the local routers and the one or more computer devices may be combined by matching metadata attributes and labeling the data based on application information received.

In an embodiment, the collected data may be automatically labeled and classified based on metadata. In an embodiment, each computer device that is used to collect the metadata may be selected based on different rules.

The collected and processed data is used to generate a device application usage profile for each mobile device 320-322 based on the network traffic that is collected. Identity information of the known mobile devices 320-322 is associated with the generated device application usage profiles respectively. Every user in a family, for example, has a distinctive pattern of application usage and the embodiments of the invention enable using the generated device application usage profiles to identify those devices whose identity information is unknown to the local network. Even only the background data generated by a device can be helpful to identify same devices having different MAC addresses, for example. As the number of devices per household with MAC randomization is relatively tiny, this application usage-based device tracking can be a practical additional data point. In case a machine learning algorithm is used to implement the solution, the input for the machine learning algorithm is the past application usage profile for the devices for that specific agent and the new application usage profiles of the unknown devices. Output may be the decision that this specific application usage best matches a specific known device in the household. In an embodiment, the invention aims thus to identify unknown devices rather than tracking users or their interactions with applications or how users interact with their devices.

In an embodiment, for generating a device application usage profile for a mobile device, network traffic data is collected for a predetermined minimum amount of time. The data collection phase can be one day or even less but also longer time periods can be used to improve the accuracy of the device application usage profiles. Any relevant data can be used to generate the device application usage profiles such as device identification, application identification and a time window when the application was used. The time window data can help when the application is actively used by a user as different people tend to use different applications and usually at different time windows. As users install and uninstall applications over time and their behavior on how applications are used changes over time, updating the device application usage profiles for maximum efficiency can be done regularly or continuously. A differential update is an optimal way achieving this instead of an entirely new model generation, for example.

In an embodiment, also information on hardware usage of the devices may be used in addition when generating the device application usage profiles. For example, a smart watch may use a connected smart phone for network connection when in close proximity since Bluetooth connection uses less battery than a WLAN connection. This means that at network level it is possible to detect that the smart watch transfers network packets from the same MAC address as the unknown device and this information can be used as an additional data point when generating the profiles and identifying the unknown devices.

In this example, the new unknown device 330 to the local network 300 is detected. An agent on the router 310 may be used to detect the unknown device 330. Based on current MAC randomization implementations, for example, this may happen once per day per device. The agent on the router collects network traffic data related to the unknown device 330. During this time, the new device 330 is under an identification phase. The collected network traffic data is analyzed to generate a device application usage profile for the unknown device 330. At the backend 350, the device application usage profile for the unknown device 330 is compared with the profiles of the known devices in the same local network. In response to finding a difference between two profiles satisfying a predetermined threshold, the unknown device 330 is identified as a known one. An exact match may not be needed for making the identification.

In the use case example of FIG. 3, based on analysis it can be detected that the top three most used applications of the unknown device 330 are apps 1-3. Further, one of the known devices, device Y (321), is detected to have the same top three most used applications. This information may be used at least as one data point by the machine learning model to determine whether the two devices 330 and 321 are in fact same devices. The model determines whether similar application usage or behaviour has been seen before and makes a determination of whether the new device is probably the previously known device Y (321) based on application usage statistics.

Figure 4:
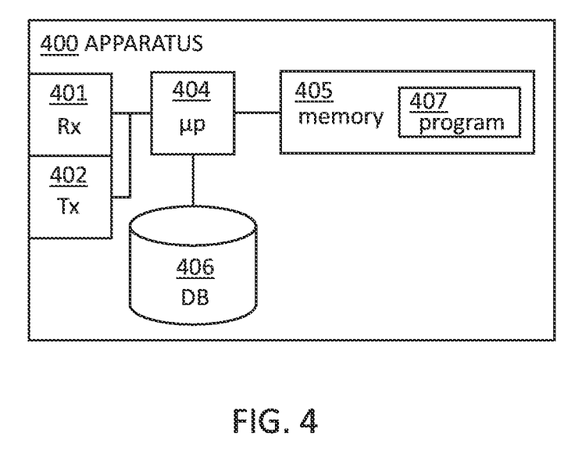
FIG. 4 is a block diagram of an example computer system environment, according to one embodiment.

FIG. 4 is a block diagram illustrating an example of a network apparatus that can implement the method according to an embodiment.

A processor device 404 is provided that is configured to generate and maintain a device application usage profile for one or more known computing devices of a local network based on network traffic data, detect an unknown computing device in the local network, collect network traffic data related to the unknown computing device, generate a device application usage profile for the unknown computing device based on the network traffic data related to the unknown computing device, compare the device application usage profile of the unknown computing device with the device application usage profile of the one or more known computing devices of the local network, and in response to detecting a difference between the device application usage profile of the unknown computing device and the application usage profile of the one or more known computing devices of the local network satisfying a predetermined threshold, identify the unknown device as a known computing device of the local network.

In an embodiment, the processor device 404 is configured to store data such as any network-based identification data, metadata, attributes, values, addresses, hostnames as well as other data related to received network traffic data, any metadata, state information and/or domain data to the database 406. The database 406 is shown in this example as being located at the apparatus 400, but it will be appreciated that the apparatus 400 may alternatively access a remote database. The database 406 may comprise necessary data collected from user devices and/or plurality of local networks.

The apparatus 400 is provided with a receiver 401 that receives the collected network traffic metadata. A transmitter 402 is also provided for communication with a computer network, a router, a computer device and/or an outside server.

In the above description, the apparatus 400 is described as having a separate transmitter and receiver. It will be appreciated that these may be disposed in any suitable manner, for example in a single transmitter and receiver, a transceiver and so on. Similarly, a single processor 404 is described but it will be appreciated that the function of the processor may be performed by a single physical processor or by more than one processor.

The apparatus 400 is also provided with a non-transitory computer readable medium in the form of a memory 405. The memory may be used to store a computer program 407 which, when executed by the processor 404, causes the processor 404 to perform the functions described above. The computer program 407 may be provided from an external source. In an embodiment, at least some or even all the functions of the method can be implemented in any apparatus, for example any computer device or a server.

Network traffic metadata generated by the one or more applications may comprise application specific network usage metadata, such as data on which application was used in which of the one or more mobile devices. The network traffic metadata may sent to a testing/analysis entity, for example, via using Wi-Fi and home network router connection of each mobile device. The network traffic metadata is collected and sent to a service cloud entity. There may be one or more analysis entities and/or other local/ISP network systems that collect network traffic metadata related to the one or more applications for the service cloud entity. For example, the network traffic metadata may comprise data from casual application usage on one or more mobile devices that is also sent to the service cloud entity from any local/ISP network.

All the network traffic metadata received from any local/ISP network systems received by the service cloud entity is processed and combined by matching metadata attributes. The received data is labelled based on the metadata attributes, such as an identity of the application and the related device and the application scenario. Any other data, such as application screen time reports sent from the one or more mobile devices, may also be used in the labelling phase. The labelling data and raw combined network activity data may be used to create machine learning datasets suitable for machine learning training, and a machine learning model for generating the device application usage profiles and identifying unknown devices is trained by using the datasets created.

The trained machine learning model may be used for identifying unknown user devices and based on the results from the machine learning model, further action can be taken to protect one or more local networks and/or the one or more user devices. The further action may comprise one or more of: blocking the client application, enforcing time limits to client application or application categories, preventing communication with the client application, applying other security measures.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for generating and maintaining a device application usage profile for one or more known computing devices of a local network based on network traffic data, a code for detecting an unknown computing device in the local network, a code for collecting network traffic data related to the unknown computing device; a code for generating a device application usage profile for the unknown computing device based on the network traffic data related to the unknown computing device, a code for comparing the device application usage profile of the unknown computing device with the device application usage profile of the one or more known computing devices of the local network, and a code for identifying the unknown device as a known computing device of the local network in response to detecting a difference between the device application usage profile of the unknown computing device and the application usage profiles of the one or more known computing devices of the local network satisfying a predetermined threshold.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    generating and maintaining a first device application usage profile for each one or more known first computing devices of a local network based on first network traffic data;
    detecting an unknown second computing device in the local network;
    collecting second network traffic data related to the unknown second computing device;
    generating a second device application usage profile for the unknown second computing device based on the second network traffic data related to the unknown second computing device;
    comparing the second device application usage profile of the unknown second computing device with the first device application usage profile of the one or more known first computing devices of the local network; and
    in response to detecting a difference between the second device application usage profile of the unknown second computing device and the first device application usage profile of the one or more known first computing devices of the local network satisfying a predetermined threshold, identifying the unknown second computing device as one of the one or more known first computing devices of the local network.

2. The method according to claim 1, wherein the first and second network traffic data comprise one or more of: background traffic data generated by one or more applications installed on the first and second computing devices, data generated by active usage of the one or more applications, and data generated from running the one or more applications in various application scenarios on the first and second computing devices for one or more predetermined time periods.

3. The method according to claim 1, wherein the first and second network traffic data is collected by a network traffic hub of the local network.

4. The method according to claim 1, further comprising collecting the first and second network traffic data for generating the first and second device application usage profiles during one or more predetermined time periods.

5. The method according to claim 1, further comprising determining an active application usage time in relation to an application scenario during the time window based on the first and second network traffic data and using the active application usage time for generating the first and second device application usage profiles.

6. The method according to claim 1, further comprising updating the first device application usage profiles regularly by one or more of: a differential update, and generating one or more new device application usage profiles.

7. The method according to claim 1, further comprising collecting data related to hardware usage of the first and second computing devices and using the data related to the hardware usage for generating the first and second device application usage profiles.

8. The method according to claim 7, wherein the step of identifying the unknown second computing device as a known first computing device further comprises: in response to detecting any one of the one or more known first computing devices transferring network traffic data by using a same unique identifier address with the unknown second computing device based on comparing, identifying the unknown second computing device as a known first computing device.

9. The method according to claim 1, further comprising:
training a machine learning model to generate the first and second device application usage profiles; and
using the machine learning model to identify the unknown second computing device as a known computing device of the local network.

10. The method according to claim 9, further comprising retraining the machine learning model continuously and/or regularly based on further network traffic data captured from the first and second computing devices running further applications in various application scenarios.

11. The method according to claim 1, further comprising forwarding the first and second network traffic data collected from the first and second computing devices to a service cloud for generating the first and second device application usage profiles for the one or more known first computing devices and/or the unknown second computing device.

12. The method according to claim 1, further comprising taking further action on the basis of identifying the unknown second computing device as a known computing device of the local network, wherein the further action comprises one or more of: reporting a deduplication incident, controlling or blocking usage of one or more applications, enforcing time limits on the one or more applications or on application categories, preventing computing with the one or more applications, and applying other security measures to protect the local network and/or the first and second computing devices.

13. An apparatus in a computer network system comprising:
one or more processor devices configured to:
generate and maintain a first device application usage profile for each one or more known first computing devices of a local network based on first network traffic data;
detect an unknown second computing device in the local network;
collect second network traffic data related to the unknown second computing device;
generate a second device application usage profile for the unknown second computing device based on the second network traffic data related to the unknown second computing device;
compare the second device application usage profile of the unknown second computing device with the first device application usage profile of the one or more known first computing devices of the local network; and
in response to detecting a difference between the second device application usage profile of the unknown second computing device and the first device application usage profile of the one or more known first computing devices of the local network satisfying a predetermined threshold, identify the unknown second computing device as one of the one or more known first computing devices of the local network.

14. The apparatus according to claim 13, wherein the first and second network traffic data comprise one or more of: background traffic data generated by one or more applications installed on the first and second computing devices, data generated by active usage of the one or more applications, and data generated from running the one or more applications in various application scenarios on the first and second computing devices for one or more predetermined time periods.

15. The apparatus according to claim 13, wherein the one or more processor devices are further configured to generate the first and second device application usage profiles based on one or more of: device identification data, application identification data, and a time window when an application was used.

16. The apparatus according to claim 15, wherein the one or more processor devices are further configured to determine an active application usage time in relation to an application scenario during the time window based on the first and second network traffic data and using the active application usage time for generating the first and second device application usage profiles.

17. The apparatus according to claim 13, wherein the one or more processor devices are further configured to forward the first and second network traffic data collected from the first and second computing devices to a service cloud for generating the first and second device application usage profiles for the one or more known first computing devices and/or the unknown second computing device.

18. The apparatus according to claim 13, wherein the one or more processor devices are further configured to take further action on the basis of identifying the unknown second computing device as a known computing device of the local network, wherein the further action comprises one or more of: reporting a deduplication incident, controlling or blocking usage of the one or more applications, enforcing time limits on the one or more applications or on application categories, preventing computing with the one or more applications, and applying other security measures to protect the local network and/or the first and second computing devices.

19. A non-transitory computer-readable medium comprising stored program code, the program code comprising computer-executable instructions that, when executed by a processor, cause the processor to:
generate and maintain a first device application usage profile for each one or more known first computing devices of a local network, based on first network traffic data;
detect an unknown second computing device in the local network;
collect second network traffic data related to the unknown second computing device;

generate a second device application usage profile for the unknown second computing device based on the second network traffic data related to the unknown second computing device;

compare the second device application usage profile of the unknown second computing device with the first device application usage profile of the one or more known first computing devices of the local network; and in response to detecting a difference between the second device application usage profile of the unknown second computing device and the first device application usage profile of the one or more known first computing devices of the local network satisfying a predetermined threshold, identify the unknown second computing device as one of the one or more known first computing devices of the local network.

20. The non-transitory computer-readable medium of claim 19 wherein the second device application usage profile identifies a first plurality of applications that executed on the unknown second computing device and generated the second network traffic data, and wherein the first device application usage profile identifies a second plurality of applications that executed on the known first computing device that corresponds to the first device application usage profile.

* * * * *